United States Patent
Saijo

(10) Patent No.: US 10,120,363 B2
(45) Date of Patent: Nov. 6, 2018

(54) NUMERICAL CONTROLLER FOR MACHINE TOOL

(71) Applicant: FANUC CORPORATION, Yamanashi (JP)

(72) Inventor: Yoshinori Saijo, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 80 days.

(21) Appl. No.: 15/440,210

(22) Filed: Feb. 23, 2017

(65) Prior Publication Data

US 2017/0248933 A1    Aug. 31, 2017

(30) Foreign Application Priority Data

Feb. 29, 2016  (JP) ................... 2016-036871
Dec. 2, 2016   (JP) ................... 2016-234809

(51) Int. Cl.
  *G06F 19/00*   (2018.01)
  *G05B 19/18*   (2006.01)

(52) U.S. Cl.
  CPC .. *G05B 19/182* (2013.01); *G05B 2219/35426* (2013.01)

(58) Field of Classification Search
  USPC ........................................................ 700/160
  See application file for complete search history.

(56) References Cited

U.S. PATENT DOCUMENTS

2004/0204774 A1  10/2004 Fujibayashi et al.
2006/0253846 A1* 11/2006 Ogata ................ G05B 19/4083
                                                  717/151

(Continued)

FOREIGN PATENT DOCUMENTS

CN  102854831 A   1/2013
CN  103207588 A   7/2013
CN  103477290 A  12/2013

(Continued)

OTHER PUBLICATIONS

English Abstract (JP 2004-152322 A) and Machine Translation for Japanese Publication No. 3727637 B2, published Oct. 7, 2005, 40 pgs.

(Continued)

*Primary Examiner* — Mohammad Ali
*Assistant Examiner* — Md Azad
(74) *Attorney, Agent, or Firm* — Fredrikson & Byron, P.A.

(57) ABSTRACT

A numerical controller for a machine tool is equipped with a decoding unit for analyzing a machining program and a plurality of auxiliary programs, a command element extraction unit for determining the presence or absence of a relationship between the auxiliary programs, a load computing unit for computing a processing time of the machining program and processing times of the plurality of auxiliary programs, an execution sequence computing unit for computing an execution sequence of the machining program and the plurality of auxiliary programs so as to execute the auxiliary programs that have the relationship with each other within the same execution cycle, and an execution processing unit for executing the machining program and the auxiliary programs in accordance with the computed execution sequence.

8 Claims, 10 Drawing Sheets

(56) References Cited

U.S. PATENT DOCUMENTS

| | | | | |
|---|---|---|---|---|
| 2013/0139088 A1* | 5/2013 | King | .................. | G05B 19/4093 715/771 |
| 2015/0338845 A1* | 11/2015 | Haga | .................... | G05B 19/042 700/180 |

FOREIGN PATENT DOCUMENTS

| | | | |
|---|---|---|---|
| CN | 103676772 | A | 3/2014 |
| CN | 104303118 | A | 1/2015 |
| JP | 200134320 | A | 2/2001 |
| JP | 200143096 | A | 2/2001 |
| JP | 3727637 | B2 | 10/2005 |
| JP | 6381302 | B2 | 10/2013 |
| JP | 6469128 | B2 | 2/2014 |

OTHER PUBLICATIONS

English Abstract (JP 2010-262471 A) and Machine Translation for Japanese Publication No. 5381302 B2, published Oct. 11, 2013, 11 pgs.

English Abstract (JP 2013-003679 A) and Machine Translation for Japanese Publication No. 5469128 B2, published Feb. 7, 2014, 8pgs.

English Abstract and Machine Translation for Japanese Publication No. 2001-043096 A, published Feb. 16, 2001, 14 pgs.

English Abstract and Machine Translation for Japanese Publication No. 2001-034320 A, published Feb. 9, 2001, 18 pgs.

Untranslated Decision to Grant a Patent mailed by Japan Patent Office (JPO) for Application No. 2016-234809, dated Feb. 28, 2018, 3 pages.

English machine translation of Decision to Grant a Patent mailed by Japan Patent Office (JPO) for Application No. 2016-234809, dated Feb. 28, 2018, 3 pages.

English Abstract and Machine Translation for Chinese Publication No. 103477290 A, published Dec. 25, 2013, 48 pgs.

English Abstract and Machine Translation for Chinese Publication No. 103207588 A, published Jul. 17, 2013, 13 pgs.

English Abstract and Machine Translation for Chinese Publication No. 102854831 A, published Jan. Jan. 2, 2013, 15 pgs.

English Abstract and Machine Translation for Chinese Publication No. 103676772 A, published Mar. 26, 2014, 26 pgs.

English Abstract and Machine Translation for Chinese Publication No. 104303118 A, published Jan. 21, 2015, 33 pgs.

\* cited by examiner

NUMERICAL CONTROLLER FOR MACHINE TOOL

CROSS-REFERENCE TO RELATED APPLICATIONS

This application is based upon and claims the benefit of priority from Japanese Patent Applications No. 2016-036871 filed on Feb. 29, 2016, and No. 2016-234809 filed on Dec. 2, 2016, the contents all of which are incorporated herein by reference.

BACKGROUND OF THE INVENTION

Field of the Invention:

The present invention relates to a numerical controller for a machine tool, and more specifically, relates to a numerical controller for a machine tool, in which a machining program is executed in a predetermined execution cycle, together with executing one or more auxiliary programs from among a plurality of auxiliary programs within the execution cycle of the machining program.

Description of the Related Art:

The present applicant has already succeeded in developing, and has obtained a patent for a numerical controller, which is capable of easily carrying out both axial operation (motion) control and sequence control, without having to use a special unit for conversion of programs to be executed, by coding, in NC program format, both a program that is executed repeatedly at certain intervals, such as a sequence program that performs sequence control for a multi-axis machine tool, and an NC program that starts a machining process by an execution command and controls operations (motions) of respective axes, (see Japanese Patent No. 3764436).

Further, for example, a control method for a control software execution system has been proposed, which is capable of executing control software efficiently by realizing flexibility in the system for specifying an execution for each task so as to allocate an appropriate processing time to each task (see Japanese Patent No. 3727637).

In relation thereto, a parallel scheduling device has also been proposed in which it is possible to obtain parallelized scheduling results in a short time with respect to programs having a large number of tasks, by extracting as objects of analysis the tasks having a large difference in processing times of such tasks depending on program execution conditions (see Japanese Patent No. 5381302).

Furthermore, in a method of assigning a priority to processes and preferentially processing the processes having high priority, a device and method for processing execution of programs have also been proposed, which can improve processing capability by adequately utilizing CPU capability when executing a large number of programs, by allocating resources necessary for program execution to each program sequentially, in descending order according to priority of the execution stage from among a plurality of execution stages at each unit time, until the end of the unit time (see Japanese Patent No. 5469128).

SUMMARY OF THE INVENTION

With the control system for a numerical controller according to the conventional art, taking an automatic cutting device as an example, the system is provided with a group of machining programs that are made up from a machining program corresponding to a cutting time when machining is actually carried out, and machining programs corresponding to non-cutting times when preparatory operations for machining or measurements, etc., are carried out. The machining programs corresponding to the non-cutting times are excluded from among the group of machining programs. In addition, by executing the excluded machining programs corresponding to the non-cutting times within an execution cycle for automatic operation of the machining program corresponding to the cutting time when actual machining is carried out, it is possible to shorten the cycle time with respect to an execution cycle of the group of machining programs.

More specifically, in such a control system for a numerical controller, processing of programs for obtaining position information, signal information, etc. to thereby realize a desired machining operation is performed responsive to status of automatic operation. When execution processing of the group of machining programs is carried out, there is a need for demanding real time performance, together with carrying out processing operations at a high-speed execution cycle.

Thus, execution processing in which such real time performance is satisfied, and which is required to be completed within the execution cycle will be described with reference to FIG. 8. Hereinbelow, programs that carry out measurements or preparatory operations for machining will be referred to as auxiliary programs, and only the program that actually performs machining will be referred to as a machining program. FIG. 8 is an explanatory diagram showing a state in which execution processing of auxiliary programs comes to an end within an execution cycle of the machining program, in a numerical controller according to the conventional art.

In FIG. 8, the phrase "automatic operation execution processing" indicates an execution processing state related to automatic operations of a machine tool by the machining program. Further, "execution processing of auxiliary program 1", "execution processing of auxiliary program 2", and "execution processing of auxiliary program 3" are indicative of execution processing states of the auxiliary programs executed within the execution cycle of the machining program.

In this case, if the number of applications operated during execution processing of the automatic operations by the machining program increases accompanying enhancement in functionality of machining by the machine tool being achieved, the execution processing to be completed within the execution cycle naturally increases. Consequently, when execution processing is not completed within the execution cycle, it leads to system shutdowns and the like, and therefore, in order to avoid such a drawback, it is necessary to alleviate the increased processing load executed within the execution cycle.

An example of alleviating the increased processing load executed within the execution cycle is shown in FIG. 9. In this case, the "execution processing of the auxiliary program 3" is executed in a next execution cycle, the load within the execution cycle is simply leveled, execution processing of auxiliary program 1 and auxiliary program 2, which are capable of being processed within the execution cycle, are performed, and the processing load within the initial execution cycle are alleviated by shifting execution processing of auxiliary program 3, which corresponds to the increased load, to the next execution cycle.

FIG. 10 provides an explanation in relation to execution processing of the auxiliary program 3. In this case, the execution processing of auxiliary programs having a high relationship with each other is exemplified. For example, among the "auxiliary program 1", the "auxiliary program 2", and the "auxiliary program 3", in the case that an application that executes the "auxiliary program 3" is created using a calculation result of the "auxiliary program 1", then by alleviating the processing load as shown in FIG. 9, when execution processing of the "auxiliary program 3" is carried out in a subsequent execution cycle, from initiation of the "auxiliary program 1" including variables #100, #101 related to the processing load thereof until completion of the "auxiliary program 3" including variables #100, #101 related to the processing load for reading, at least two execution cycles are needed concerning processing related to the variables #100 and #101. In this manner, there is a drawback in that a delay occurs in the actual operations of the machine tool due to the execution sequence of the auxiliary programs, and real time performance is impaired.

The present invention has been devised taking into consideration the aforementioned problems, and has the object of providing a numerical controller for a machine tool in which, with respect to a plurality of auxiliary programs to be executed within an execution cycle of a machining program, relationships of the respective individual auxiliary programs are analyzed, and an execution sequence thereamong is determined, whereby it is possible to appropriately carry out processing operations at a high execution speed with superior real time performance.

In an aspect of the present invention, a numerical controller for a machine tool is provided, for executing a machining program in a predetermined execution cycle and executing one or more auxiliary programs from among a plurality of auxiliary programs within the execution cycle. The numerical controller for a machine tool is equipped with a decoding unit configured to analyze the machining program and the plurality of auxiliary programs, a command element extraction unit configured to determine the presence or absence of a relationship between the auxiliary programs, based on analysis result of the decoding unit, a load computing unit configured to compute a processing time of the machining program and processing times of the plurality of auxiliary programs, based on the analysis result of the decoding unit, an execution sequence computing unit configured to compute an execution sequence of the machining program and the plurality of auxiliary programs so as to execute the auxiliary programs that have the relationship with each other within the same execution cycle, responsive to the processing time of the machining program and the processing times of the plurality of auxiliary programs, and an execution processing unit configured to execute the machining program and the auxiliary programs in accordance with the computed execution sequence.

In accordance with the above configuration, the presence or absence of a relationship mutually between the plurality of auxiliary programs is determined by the decoding unit and the command element extraction unit, whereas the load computing unit computes processing times of the machining program and the auxiliary programs. In addition, an execution sequence of the machining program and the auxiliary programs is computed on the basis of the presence or absence of the relationship and the processing times of the machining program and the auxiliary programs, and execution processing thereof is performed. Consequently, appropriate processing can be performed at a high execution speed, and which is superior in real time performance upon execution processing of the auxiliary programs.

Further, based on the analysis result of the decoding unit, the command element extraction unit may extract a variable used in common by two or more of the auxiliary programs, and may determine that the auxiliary programs that use the variable in common have the relationship with each other. In accordance with this feature, relationships between the auxiliary programs can be determined with high accuracy.

Furthermore, based on the analysis result of the decoding unit, the command element extraction unit may set a degree of association between the auxiliary programs that have the relationship to be higher as the number of the variables used in common by the auxiliary programs becomes larger, and the execution sequence computing unit may compute the execution sequence such that the auxiliary programs having a high degree of association are adjacent to each other.

In accordance with this feature, the auxiliary programs that have a higher degree of association therebetween have more variables used in common by the auxiliary programs, and thus such auxiliary programs are executed within the same execution cycle, whereby the execution speed of the auxiliary programs can be enhanced.

Still further, based on the analysis result of the decoding unit, the command element extraction unit may set a priority that determines the execution sequence of the auxiliary programs that have the relationship, and the execution sequence computing unit may compute the execution sequence such that the auxiliary programs having a high degree of association are adjacent to each other and are executed in order of higher priority.

In accordance with this feature, among the auxiliary programs having a relationship, the auxiliary programs for which priority is low can perform processing using the processing result of the auxiliary programs for which priority is high, and therefore, it is possible to suppress execution processing errors of the auxiliary programs.

Still further, concerning each of the auxiliary programs that use the variable in common, the command element extraction unit may determine whether the commonly used variable is used for writing or for reading, and may set the priority of the auxiliary programs in which the commonly used variable is used for writing to be higher than the priority of the auxiliary programs in which the commonly used variable is used for reading.

According to this feature, variables for which writing is performed by previously-executed auxiliary programs are read by subsequently-executed auxiliary programs, and therefore, execution processing errors of the auxiliary programs can be prevented.

Further, the numerical controller may be further equipped with a different load computing unit configured to measure the processing time of the machining program and the processing times of the auxiliary programs when the machining program and the auxiliary programs are executed in the execution processing unit, and the execution sequence computing unit may reconsider the execution sequence, based on the processing time of the machining program and the processing times of the auxiliary programs that were measured by the different load computing unit.

Owing to this feature, when the actual processing time measured by the other load computing unit differs from the processing time computed from the analysis result of the decoding unit by the load computing unit, the execution sequence can be reconsidered at any time, and an execution sequence conforming to the actual processing time can be set. Thus, real time performance in relation to execution processing of the auxiliary programs can be enhanced, and processing by the auxiliary programs can be performed at higher speed.

Furthermore, based on the analysis result of the decoding unit, the command element extraction unit may extract a continuation command indicative of an instruction to carry out a repetitive process, and the execution sequence computing unit may compute the execution sequence such that the auxiliary program having the continuation command is executed repeatedly in the execution processing unit. In accordance with this feature, an auxiliary program having the continuation command can be executed repeatedly.

Further still, the numerical controller may be further equipped with a different load computing unit configured to measure the processing time of the auxiliary program having the continuation command when the auxiliary program having the continuation command is executed in the execution processing unit, and the execution sequence computing unit may reconsider the execution sequence, based on the processing time of the auxiliary program having the continuation command that was measured by the different load computing unit.

Load of the auxiliary program having the continuation command varies due to the control content actually executed with each repeated execution, and therefore, the processing time thereof also varies. Thus, for the auxiliary program having the continuation command, the load computing unit computes the processing time thereof when the load becomes largest. For this reason, cases occur in which a processing time when the auxiliary program having the continuation command is actually executed is shorter than the processing time computed by the load computing unit. The actual processing time of the auxiliary program having the continuation command is measured by the different load computing unit, and by reconsidering the execution sequence on the basis of the measured processing time, an execution sequence conforming to the actual processing time can be computed. Thus, real time performance in relation to execution processing of the auxiliary programs can be enhanced, and processing by the auxiliary programs can be performed at higher speed.

Still further, the execution sequence computing unit may set a processing time capable of executing the machining program and the auxiliary programs within the execution cycle as a processing load limit value, and may compute the execution sequence such that a sum of the processing time of the machining program and the processing times of the auxiliary programs executed within the execution cycle is less than or equal to the processing load limit value.

In accordance with this feature, when the auxiliary programs are executed within the execution cycle of the machining program, processing of the auxiliary programs can be completed prior to the machining program being executed next, and system shutdowns can thus be avoided.

Further, the load computing unit may measure the processing time of the machining program when the machining program is executed in the execution processing unit, and the execution sequence computing unit may compute the execution sequence responsive to the measured processing time of the machining program.

Since the auxiliary programs are executed after completion of processing of the machining program, the processing time of the machining program that was executed first is measured, and the execution sequence of the auxiliary programs executed thereafter can be set responsive to the actual processing time of the machining program. Therefore, an execution sequence dependent on the actual processing time of the machining program can be computed. Thus, real time performance in relation to execution processing of the auxiliary programs can be enhanced, and processing by the auxiliary programs can be performed at higher speed.

According to the present invention, suitable processing operations can be performed with high execution speed, and which are superior in real time performance.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A preferred embodiment of a numerical controller for a machine tool according to the present invention will be presented and described in detail below with reference to the accompanying drawings.

Figure 1:
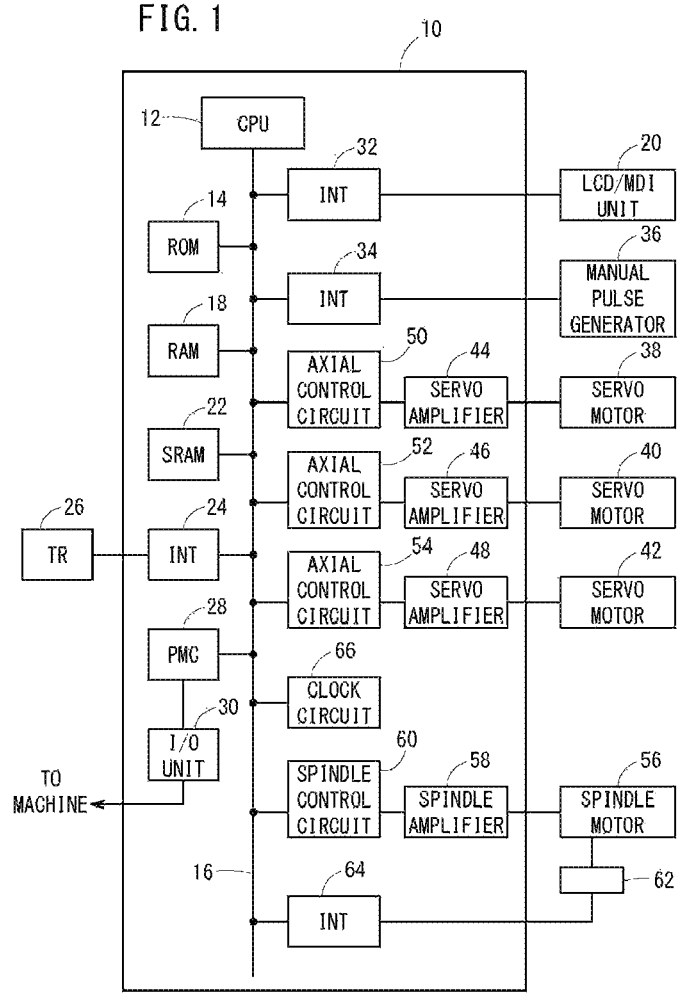
FIG. 1 is a control system diagram of main components of a numerical controller for a machine tool for carrying out execution processing of a plurality of auxiliary programs within an execution cycle of a machining program according to the present invention.

FIG. 1 is a control system diagram of main components of a numerical controller for a machine tool according to an embodiment of the present invention.

The numerical controller 10 is equipped with a CPU 12. The CPU 12 controls respective units of the numerical controller 10. The CPU 12 reads out system programs that are stored in a ROM 14 through a bus 16, and controls the respective units of the numerical controller 10 in accordance with the system programs. Various types of system programs for implementing processes for automatic operation and processes for an editing mode, which is required for creating and editing the machining program or the like, are written beforehand in the ROM 14. In a RAM 18, there are stored temporary computed data, display data, and various types of data, etc., which are input by an operator through an LCD/MDI unit 20.

An SRAM 22 is backed up by a battery (not shown) and is configured as a nonvolatile memory in which the storage state is maintained even when the power supply of the numerical controller 10 is turned off. A program to measure the initial position, a program for performing thermal displacement compensation of the machine tool, a machining program (to be described later) read in via an interface 24, and a machining program input via the LCD/MDI unit 20, etc., are stored in the SRAM 22.

The interface 24 is an interface for external equipment that is capable of being connected to the numerical controller 10, and external equipment 26 such as an external storage device or the like is connected to the interface 24. A machining program, a thermal displacement measurement program, etc., are read in from the external storage device. A PMC (programmable machine controller) 28 controls auxiliary devices or the like on the side of the machine tool with sequence programs incorporated in the numerical controller 10. More specifically, according to an M function, an S function, and a T function commanded by the machining program, signals required for the auxiliary devices are converted by the sequence programs, and are output to the auxiliary devices from an I/O unit 30. The auxiliary devices such as various actuators and the like are operated by such output signals. Further, signals from various switches and the like of an operation panel provided on a main body of the machine tool are received, and are subjected to necessary processes, and the signals are passed to the CPU 12.

The current positions of respective axes of the machine tool, alarms, parameters, and image signals of image data, etc., are transmitted to the LCD/MDI unit 20, and are displayed on a display of the LCD/MDI unit 20. The LCD/MDI unit 20 is a manual data input device having a display, a keyboard, and the like. An interface 32 receives data from the keyboard of the LCD/MDI unit 20 and passes such data to the CPU 12.

An interface 34 is connected to a manual pulse generator 36. The manual pulse generator 36 is provided on the operation panel of the machine tool, and is used for precisely positioning movable parts of the machine tool with respective axial controls, by way of distribution pulses on the basis of manual operations.

Axial control circuits 50, 52, 54 that move a non-illustrated table of the machine tool along X, Y axes and a Z axis receive movement commands for the respective axes from the CPU 12, and output the movement commands for the axes respectively to servo amplifiers 44, 46, 48. The servo amplifiers 44, 46, 48 receive the commands and operate servo motors 38, 40, 42 of the respective axes of the machine tool. Non-illustrated pulsecoders for detecting positions are incorporated in the servo motors 38, 40, 42 of the axes. Position signals from the pulsecoders are fed back in the form of pulse trains.

A spindle control circuit 60 receives a spindle rotation command for the machine tool, and outputs the spindle speed signal to a spindle amplifier 58. The spindle amplifier 58 receives the spindle speed signal, and rotates a spindle motor 56 of the machine tool at the instructed rotation speed, thereby driving a tool.

A position coder 62 is coupled to the spindle motor 56 by a gear, a belt, or the like. The position coder 62 outputs feedback pulses in synchronization with rotation of the spindle, and the feedback pulses are read by the CPU 12 via an interface 64. A clock circuit 66 serves as a timing device, which is adjusted in synchronism with the current time.

Figure 2:
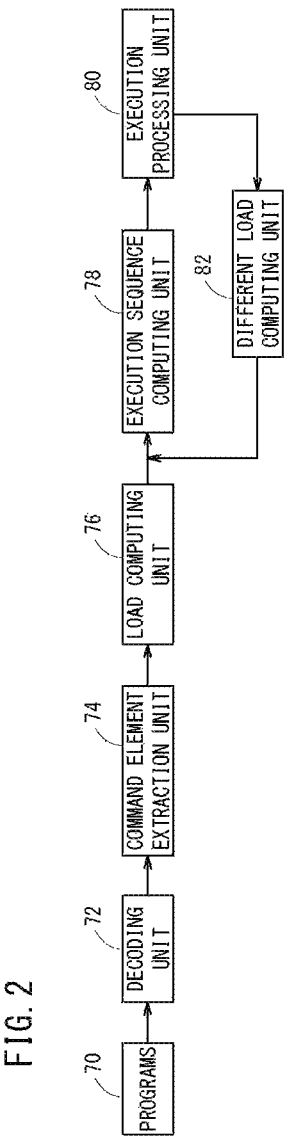
FIG. 2 is a block system diagram of a control system of execution processing of the machining program and the plural auxiliary programs according to the present invention.

FIG. 2 is a block system diagram of a control system for execution processing of the machining program and auxiliary programs in the numerical controller for a machine tool according to the present invention.

The machining program is a program that relates to an automatic operation process for carrying out machining by the machine tool, whereas the auxiliary programs are programs that relate to processes for carrying out preparatory operations or measurements, etc., for machining. The machining program is executed at a predetermined execution cycle. The auxiliary programs are executed within the execution cycle of the machining program.

A plurality of auxiliary programs are prepared corresponding to respective processes. Normally, the plurality of auxiliary programs are executed in a predetermined execution sequence. However, as will be described later, the execution sequence is rearranged according to relationships between the auxiliary programs. Moreover, concerning the auxiliary programs, depending on the processes, there are auxiliary programs which are executed only one time, whereas there also are auxiliary programs including a continuation command therein, which is a command that is executed repeatedly. The execution sequence of the auxiliary programs is rearranged also based on such continuation commands.

Programs 70 shown in FIG. 2 are a machining program and auxiliary programs that are stored in the SRAM 22. In this instance, the programs 70 are analyzed (subjected to program analysis) by a decoding unit 72 in the CPU 12, and execution data are created. Next, in a command element extraction unit 74 in the CPU 12, the height of the relationships between the auxiliary programs is determined from the individual auxiliary programs that have been analyzed, and the result of such a determination is stored as a "degree of association" in the SRAM 22. Furthermore, the command element extraction unit 74 in the CPU 12 determines the "degree of association" and a "priority" for determining the execution sequence among the auxiliary programs having the relationship therebetween. Then, the command element extraction unit 74 extracts "continuation commands" which represent that commands are issued repeatedly during the machining process. Data pertaining to the degree of association, the priority, and the continuation commands may be stored in the RAM 18 shown in FIG. 1, for example. Further, the processing time of the machining program and the processing times of the auxiliary programs are computed in a load computing unit 76 in the CPU 12, and the computation results thereof are stored in the RAM 18.

Additionally, in an execution sequence computing unit 78 in the CPU 12, the execution sequence of the machining program and the auxiliary programs is computed from the "degree of association" and the "priority" as well as the "processing times" and the "continuation commands". When the computation result of the execution sequence is obtained, based on the execution sequence computed by the execution sequence computing unit 78, execution processing of the machining program and the auxiliary programs is performed via an execution processing unit 80.

In this case, with respect to the machining program and the auxiliary programs executed by the execution processing unit 80 in the CPU 12, by a different load computing unit 82, the processing time of the machining program and the processing times of the auxiliary programs may be measured and fed back to the execution sequence computing unit 78, and appropriate reconsideration of the execution sequence of the machining program and the auxiliary programs may be performed.

Next, embodiments concerning computational processing of the execution sequence of the machining program and the plurality of auxiliary programs will be described.

(Embodiment 1)

Figure 3:
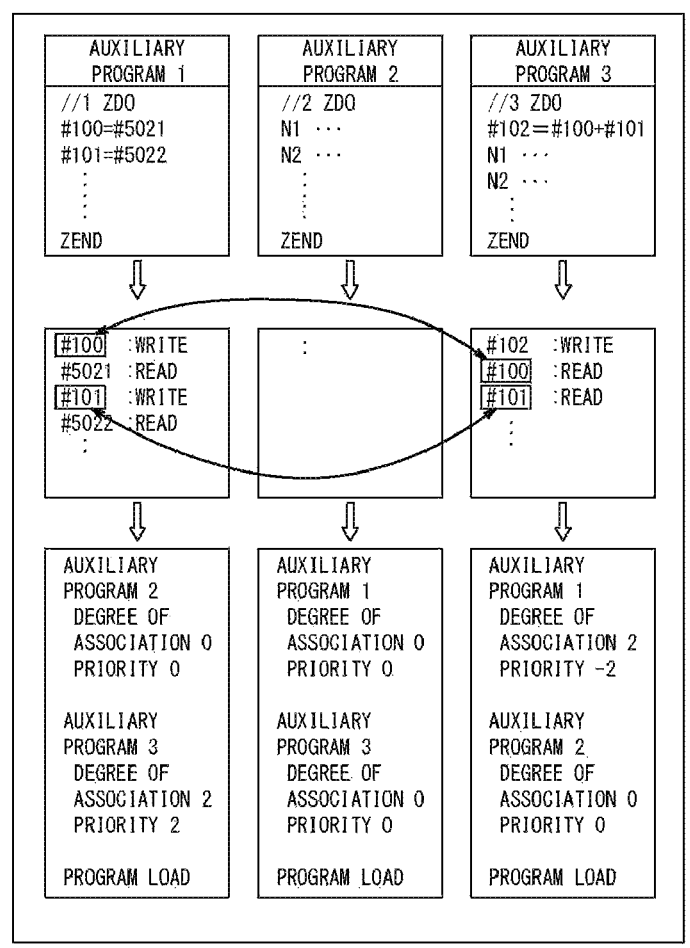
FIG. 3 is an explanatory diagram showing a computational processing method of degrees of association, priority, and program loads of the plural auxiliary programs in the numerical controller of the present invention.

FIG. 3 shows a computational processing method of degrees of association, priority, and program loads of the auxiliary programs. Command statements and variables, etc., written in the respective auxiliary programs are shown in the upper part of FIG. 3, variables extracted from the respective auxiliary programs by the command element extraction unit 74 are shown in the middle part of FIG. 3, and information of the degrees of association, the priority, and the program loads of the auxiliary programs is shown in the lower part of FIG. 3.

The various commands of the respective auxiliary programs shown in the upper part of FIG. 3 have the following meanings. In the present embodiment, the description of the auxiliary programs is presented in NC program format, which has been proposed by the applicant by the aforementioned Japanese Patent No. 3764436.

| | |
|---|---|
| ‖1ZDO | : Start of Auxiliary Program 1 |
| #100=#5021 | : Machine Coordinate Value of X-axis (1st axis) is assigned to #100 |
| #101=#5022 | : Machine Coordinate Value of Y-axis (2nd axis) is assigned to #101 |
| . | |
| . | |
| . | |
| ZEND | : End of Auxiliary Program 1 |
| ‖2ZDO | : Start of Auxiliary Program 2 |
| N1 ... | |
| N2 ... | |
| . | |
| . | |
| . | |
| ZEND | : End of Auxiliary Program 2 |
| ‖3ZDO | : Start of Auxiliary Program 3 |
| #102=#100+#101 | : Summation result of #100 and #101 is assigned to #102 |
| N1 ... | |
| N2 ... | |
| . | |
| . | |
| . | |
| ZEND | : End of Auxiliary Program 3 |

The command element extraction unit 74 searches the commands shown in the upper part of FIG. 3 for processing-load-related variables in the individual auxiliary programs (such as the auxiliary programs 1 through 3) that are used as common data mutually between the auxiliary programs. More specifically, with the command element extraction unit 74, extraction of the variables from the auxiliary programs 1 through 3 is carried out from the analysis results of the programs. Next, the command element extraction unit 74 determines the presence or absence of relationships between the auxiliary programs. In the example shown in FIG. 3, since the variable #100 and the variable #101 are common to both of the auxiliary program 1 and the auxiliary program 3, it is determined that the relationship between the programs is high (exists), whereas, since there are no common variables in the auxiliary program 2, it is determined that the relationship of the auxiliary program 2 with the other programs is low (non-existent). Next, in the command element extraction unit 74, the relationships of each of the auxiliary programs with the other auxiliary programs are scored and maintained, and a "degree of association" therefor is determined. The "degree of association" becomes higher as the relationship is higher. In this case, since the auxiliary program 1 has two variables in common with respect to the auxiliary program 3, the degree of association therebetween is "2". Similarly, since the auxiliary program 3 has two variables in common with respect to the auxiliary program 1, the degree of association therebetween is "2". On the other hand, since the auxiliary program 2 has no commonality in variables with respect to the auxiliary program 1 or the auxiliary program 3, the degree of association therebetween is "0".

Next, concerning the auxiliary programs for which the presence of the relationships therebetween was determined in the above manner in the command element extraction unit 74, scoring is performed and the priority thereof is determined in accordance with whether the variables are used for "reading" or for "writing". In this case, normally, written variables are read in, and then a next condition judgment process is executed. Thus, a "priority" is determined such that "writing" thereof is performed earlier in the execution sequence, whereas "reading" is performed later in the execution sequence. More specifically, with the auxiliary program 1, the variables #100 and #101 are subjected to a writing process, and therefore, the priority thereof is "2". On the other hand, with the auxiliary program 3, the variables #100 and #101 are subjected to a reading process, and therefore, the priority thereof is "−2".

Next, the load computing unit 76 computes the program load amounts. The program load amounts are defined by the processing time of the machining program or the processing times of the auxiliary programs. More specifically, concerning the program load, at the analysis stage of the machining program and the auxiliary programs, a load amount is determined with respect to each of the individual commands of the programs, for example, by referring to a non-illustrated program load data table that estimates the load amounts of commands, the table being stored in the SRAM 22, and the integrated value of the load amounts of the commands in one program is taken as the entire load of the one program.

Figure 4:
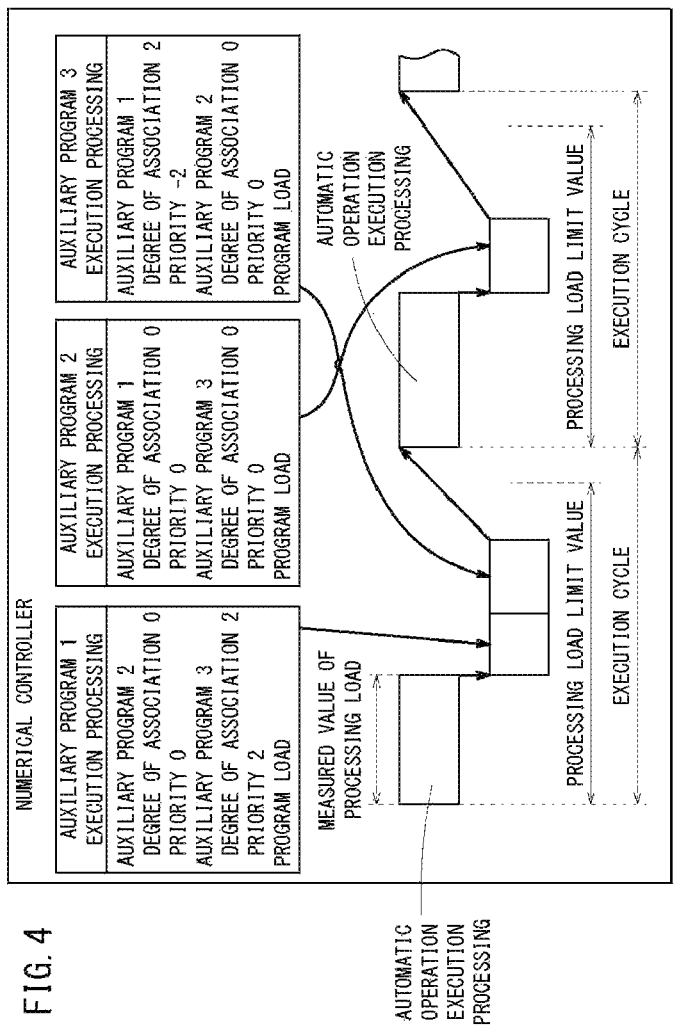
FIG. 4 is an explanatory diagram showing a method of determining an execution sequence of the auxiliary programs on the basis of the computational results of degrees of association, priority, and program loads of the plural auxiliary programs shown in FIG. 3.

FIG. 4 shows a method of determining an execution sequence of auxiliary programs within an execution cycle of the machining program, based on the above-discussed Embodiment 1 shown in FIG. 3. In FIG. 4, the phrase "automatic operation execution processing" indicates an execution processing state related to automatic operations of the machine tool by the machining program. Further, "execution processing of auxiliary program 1", "execution processing of auxiliary program 2", and "execution processing of auxiliary program 3" are indicative of execution processing states of the auxiliary programs executed within the execution cycle of the machining program.

As shown in FIG. 4, the execution sequence computing unit 78 defines beforehand as a processing load limit value a processing time in which it is possible to execute the machining program and the auxiliary programs within the execution cycle. In this case, the processing time of the "automatic operation execution processing" of the machining program is determined in the different load computing unit 82 as a measured value of the processing load, from a time measured value from a starting time to an ending time of the commands in the machining program.

Thus, among the auxiliary programs 1 through 3 that are executed within the execution cycle of the machining program, the execution sequence computing unit 78 rearranges the execution sequence thereof, such that the auxiliary program 1 and the auxiliary program 3 for which the degree of association is high can be executed within the same execution cycle, and such that the auxiliary programs for which the degree of association is high are adjacent to each other, and are executed in the order of higher priority (see FIG. 4). More specifically, the execution sequence becomes the machining program→the auxiliary program 1→the auxiliary program 3→the machining program→the auxiliary program 2, wherein the execution processing of auxiliary program 2 having a lower degree of association is passed to processing within the next execution cycle.

In the execution processing unit 80, in accordance with the execution sequence determined in the manner described above, execution processing of the machining program and the auxiliary programs is carried out such that the program loads of the machining program and the auxiliary programs, which are executed in the same execution cycle, lie within the processing load limit value.

(Embodiment 2)

Figure 5:
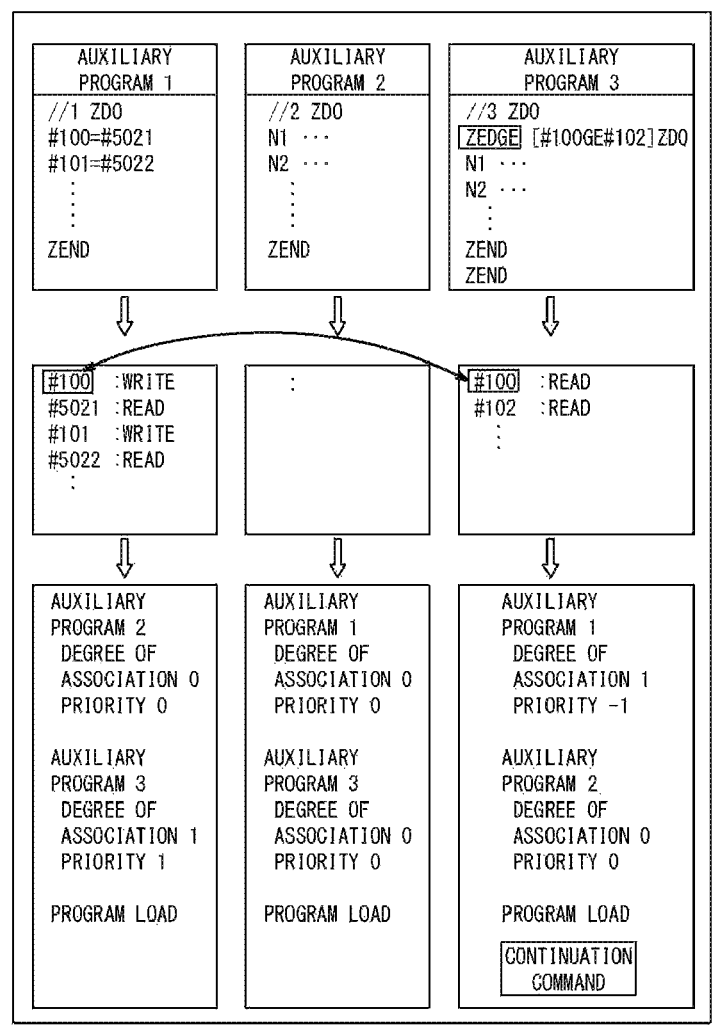
FIG. 5 is an explanatory diagram showing another embodiment of a computational processing method of degrees of association, priority, and program loads of the auxiliary programs in the numerical controller of the present invention.

FIG. 5 shows a computational processing method of degrees of association, priority, and program loads of the auxiliary programs, which are executed within the execution cycle of the machining program for performing automatic operation execution processing similar to the aforementioned Embodiment 1, in the case that execution processing of an auxiliary program is continuously executed (i.e., there is a "continuation command"). Command statements and variables, etc., written in the respective auxiliary programs are shown in the upper part of FIG. 5, variables extracted from the respective auxiliary programs by the command element extraction unit 74 are shown in the middle part of FIG. 5, and information of the degrees of association, the priority, the program loads, and the continuation commands of the auxiliary programs is shown in the lower part of FIG. 5.

The various commands (as shown in FIG. 5) of the auxiliary program examples of Embodiment 2, which include a continuation command (refer to "auxiliary program 3"), have the following meanings. In the present embodiment as well, the description of the auxiliary programs is presented in NC program format, which has been proposed by the applicant by the aforementioned Japanese Patent No. 3764436.

| | |
|---|---|
| ‖1ZDO | : Start of Auxiliary Program 1 |
| #100=#5021 | : Machine Coordinate Value of X-axis |
| (1st axis) is assigned to #100 | |
| #101=#5022 | : Machine Coordinate Value of Y-axis |
| (2nd axis) is assigned to #101 | |
| . | |
| . | |
| ZEND | : End of Auxiliary Program 1 |
| ‖2ZDO | : Start of Auxiliary Program 2 |
| N1 ... | |
| N2 ... | |
| . | |
| . | |
| ZEND | : End of Auxiliary Program 2 |
| ‖3ZDO | : Start of Auxiliary Program 3 |

-continued

| | |
|---|---|
| ZEDGE [#100GE#102] ZDO | : If #100 becomes greater than or equal to #102, execute from ZDO to ZEND |
| N1 ... | |
| . | |
| . | |
| ZEND | : Execute to this point if ZEDGE statement is satisfied |
| ZEND | : End of Auxiliary Program 3 |

With Embodiment 2 shown in FIG. 5, in the same manner as Embodiment 1 shown in FIG. 3, computational processing of the degrees of association, the priority, and the program loads is carried out, while on the other hand, a "continuation command" is added to auxiliary program 3. Consequently, similar to Embodiment 1, computation of the degree of association and the priority is determined by the relationship between the individual auxiliary programs, and the relationship between reading and writing.

On the other hand, in the case that an auxiliary program contains a control statement having a conditional determination or loop processing for repeated processing of items (repetitive process), the command element extraction unit 74 adds information that the auxiliary program has a "continuation command". In addition, the program load of the auxiliary program having the "continuation command" is defined by the greatest program load which is searched from among the program loads.

Figure 6:
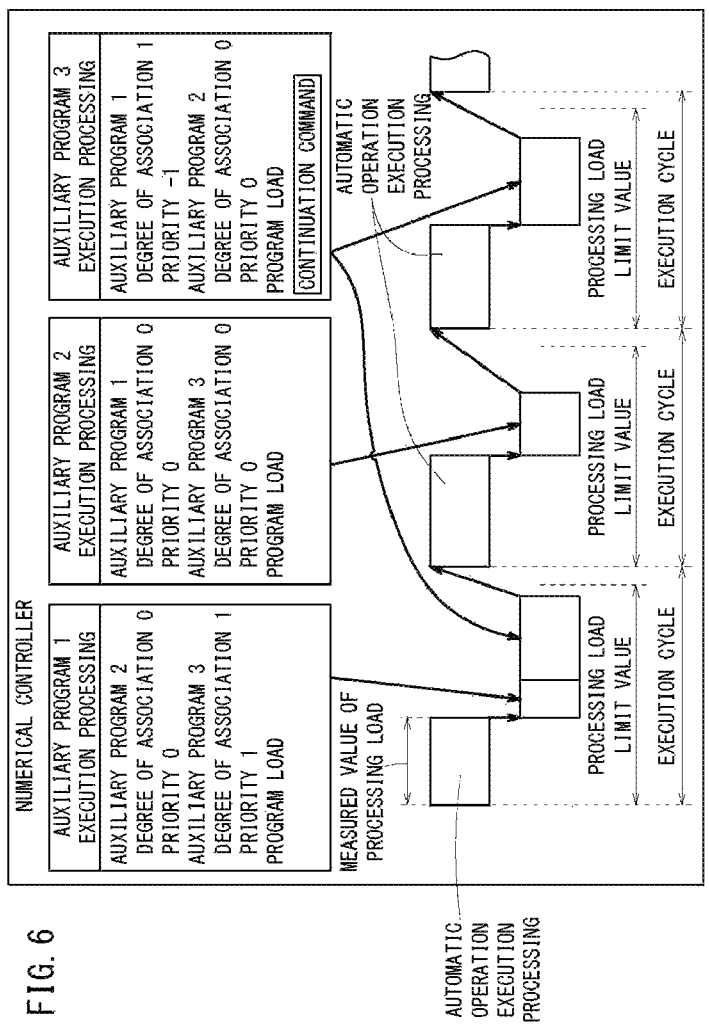
FIG. 6 is an explanatory diagram showing a method of determining an execution sequence of the auxiliary programs having a continuation command on the basis of the computational results of degrees of association, priority, and program loads of the plural auxiliary programs shown in FIG. 5.

FIG. 6 shows a method of determining an execution sequence of the auxiliary programs having the "continuation command" within the execution cycle, based on Embodiment 2 shown in FIG. 5.

In the present Embodiment 2 as well, similar to the above-described Embodiment 1, the execution sequence computing unit 78 defines beforehand as a processing load limit value a processing time in which it is possible to execute the machining program and the auxiliary programs within the execution cycle. Further, the processing time of the "automatic operation execution processing" of the machining program is determined in the different load computing unit 82 as a measured value of the processing load, from a time-measured value from a starting time to an ending time of the commands in the machining program.

Thus, among the auxiliary programs 1 through 3 that are executed within the execution cycle of the machining program, the execution sequence computing unit 78 rearranges the execution sequence thereof, such that the auxiliary program 1 and the auxiliary program 3 for which the degree of association is high can be executed within the same execution cycle, and such that the auxiliary programs for which the degree of association is high are adjacent to each other, and are executed in the order of higher priority (see FIG. 6). More specifically, the execution sequence becomes the machining program→the auxiliary program 1→the auxiliary program 3→the machining program→the auxiliary program 2, wherein the execution processing of auxiliary program 2 having a lower degree of association is passed to processing within the next execution cycle.

In the execution processing unit 80, in accordance with the execution sequence determined in the manner described above, execution processing of the machining program and the auxiliary programs is carried out such that the program loads of the machining program and the auxiliary programs, which are executed in the same execution cycle, lie within the processing load limit value.

In the present Embodiment 2, since the "continuation command" is repeatedly executed within the execution cycle, execution processing of an auxiliary program that includes the "continuation command" is performed repeatedly until the auxiliary program comes to an end. In addition, in the case of a "continuation command", in accordance with the control statements actually executed, there is a possibility for the actual processing load time to deviate significantly from the program load.

Figure 7:
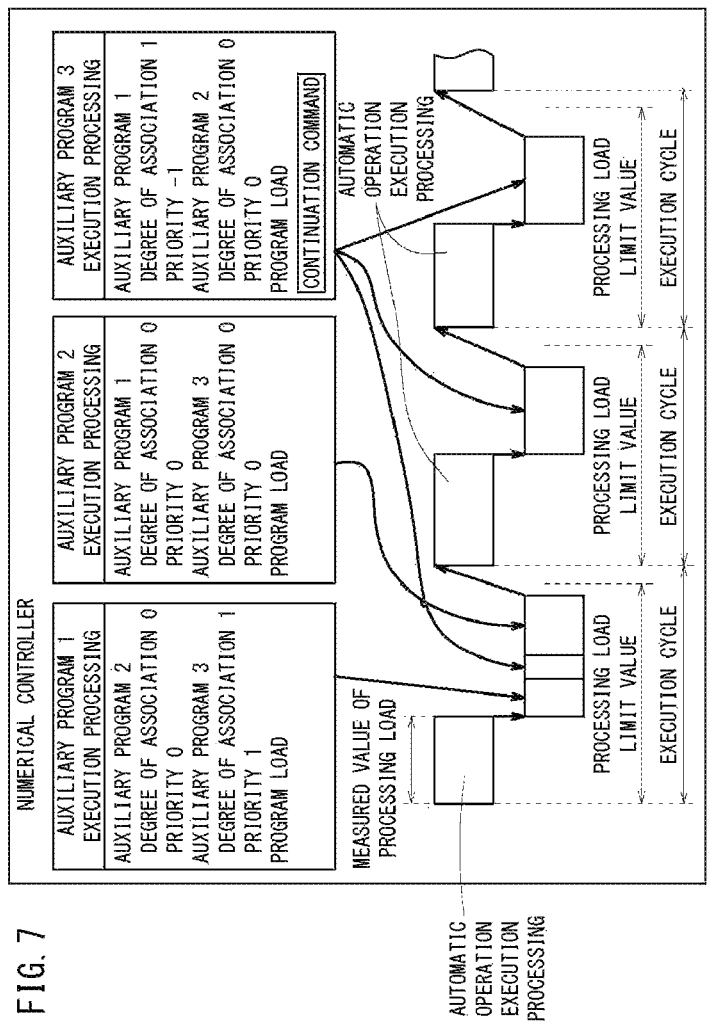
FIG. 7 is an explanatory diagram showing a reconsideration method applied with respect to the determination of the execution sequence for the auxiliary programs having the continuation command shown in FIG. 6.
Figure 8:
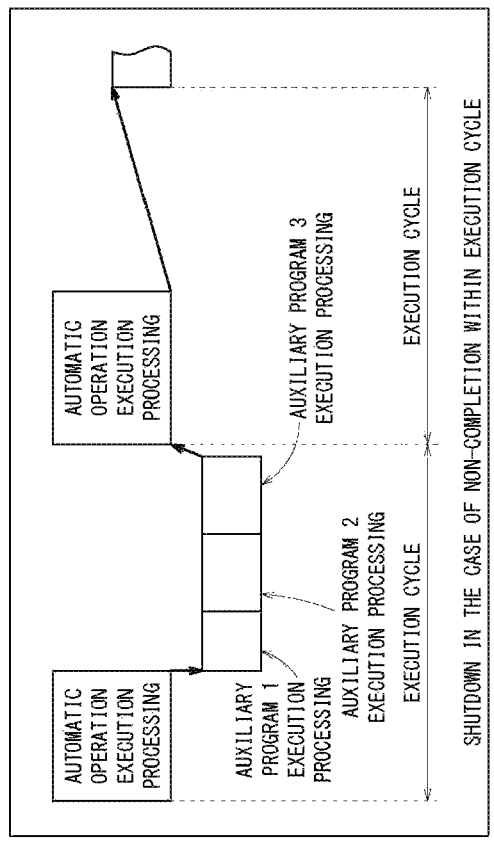
FIG. 8 is an explanatory diagram showing an execution processing state of auxiliary programs wherein the plural auxiliary programs come to an end within an execution cycle, in a numerical controller according to the conventional art.
Figure 9:
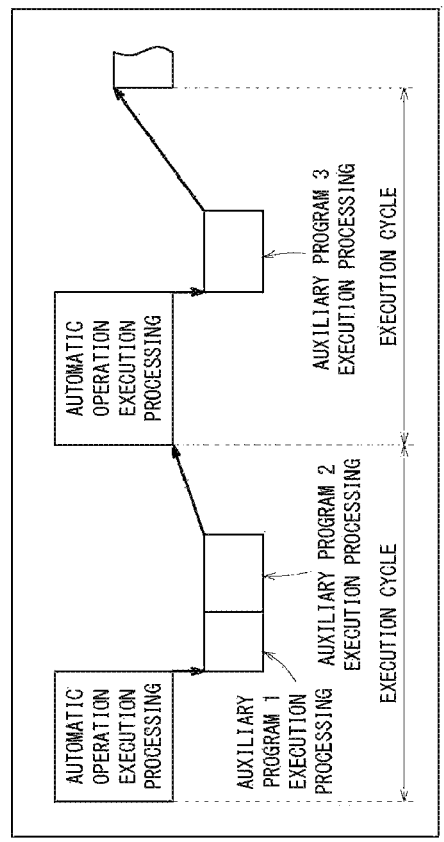
FIG. 9 is an explanatory diagram showing an execution processing state of the auxiliary programs in accordance with simple leveling, for a case in which the plural auxiliary programs do not come to an end within the execution cycle, in the numerical controller according to the conventional art.
Figure 10:
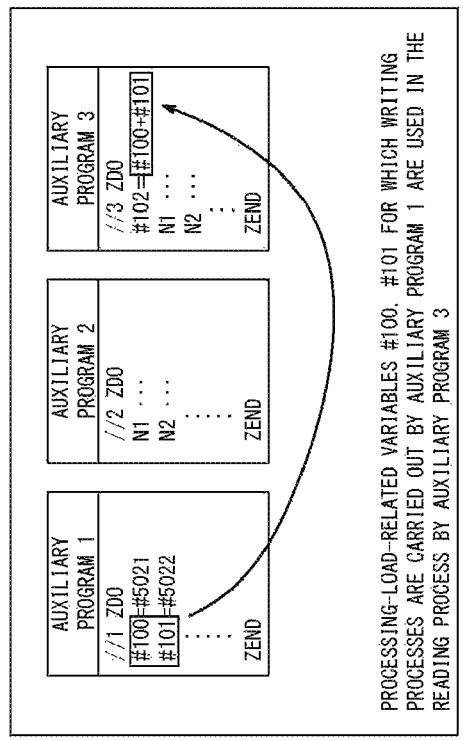
FIG. 10 is an explanatory diagram showing relationships between the plural auxiliary programs in the numerical controller.

Therefore, with an auxiliary program including a "continuation command", the processing load time within the execution cycle is measured in the different load computing unit 82, and preferably such a measured value is used to reconsider the program load during execution processing, as shown in FIG. 7.

FIG. 7 shows a method of reconsidering a determination of an execution sequence of the auxiliary programs having the "continuation command" within the execution cycle, based on Embodiment 2 shown in FIG. 6.

More specifically, in the case that the measured processing load time is small in the "execution processing of auxiliary program 3" including the "continuation command", and accordingly the program load of the "execution processing of auxiliary program 2" also lies within the processing load limit value, the execution sequence computing unit 78 reconsiders the execution sequence, such that the "execution processing of auxiliary program 2" in addition to the other auxiliary programs is operated in the previous execution cycle. More specifically, the execution sequence becomes the machining program→the auxiliary program 1→the auxiliary program 3→the auxiliary program 2→the machining program. Consequently, it is possible to determine the execution sequence, so that the actual processing load time does not deviate with respect to the processing load limit value.

Although respective preferred embodiments of the present invention have been described above, the present invention is not limited to the aforementioned embodiments, and it goes without saying that various design modifications can be made thereto without deviating from the essential scope of the present invention as set forth in the appended claims.

What is claimed is:

1. A numerical controller for a machine tool, for executing a machining program in a predetermined execution cycle and executing one or more auxiliary programs from among a plurality of auxiliary programs within the execution cycle, comprising:
   a CPU equipped in the numerical controller, the CPU to implement:
   a decoding unit configured to analyze the machining program and the plurality of auxiliary programs;
   a command element extraction unit configured to determine presence or absence of a relationship between the auxiliary programs, based on analysis result of the decoding unit;
   a load computing unit configured to compute a processing time of the machining program and processing times of the plurality of auxiliary programs, based on the analysis result of the decoding unit;
   an execution sequence computing unit configured to compute an execution sequence of the machining program and the plurality of auxiliary programs to execute the auxiliary programs that have the relationship with each other within a same execution cycle, responsive to the processing time of the machining program and the processing times of the plurality of auxiliary programs;
   a different load computing unit configured to measure the processing time of the machining program and the processing times of the auxiliary programs when the machining program and the auxiliary programs are executed in the execution processing unit;
   the execution sequence computing unit reconsiders the execution sequence, based on the processing time of the machining program and the processing times of the auxiliary programs that were measured by the different load computing unit; and
   an execution processing unit configured to execute the machining program and the auxiliary programs in accordance with the computed execution sequence.

2. The numerical controller for a machine tool according to claim 1, wherein, based on the analysis result of the decoding unit, the command element extraction unit extracts a variable used in common by two or more of the auxiliary programs, and determines that the auxiliary programs that use the variable in common have the relationship with each other.

3. The numerical controller for a machine tool according to claim 2, wherein:
   based on the analysis result of the decoding unit, the command element extraction unit sets a degree of association between the auxiliary programs that have the relationship to be higher as number of the variables used in common by the auxiliary programs becomes larger; and
   the execution sequence computing unit computes the execution sequence wherein the auxiliary programs having a high degree of association are adjacent to each other.

4. The numerical controller for a machine tool according to claim 3, wherein:
   based on the analysis result of the decoding unit, the command element extraction unit sets a priority that determines the execution sequence of the auxiliary programs that have the relationship; and
   the execution sequence computing unit computes the execution sequence wherein the auxiliary programs having a high degree of association are adjacent to each other and are executed in order of higher priority.

5. The numerical controller for a machine tool according to claim 4, wherein concerning each of the auxiliary programs that use the variable in common, the command element extraction unit determines whether the commonly used variable is used for writing or for reading, and sets the priority of the auxiliary programs in which the commonly used variable is used for writing to be higher than the priority of the auxiliary programs in which the commonly used variable is used for reading.

6. The numerical controller for a machine tool according to claim 1, wherein the execution sequence computing unit sets a processing time capable of executing the machining program and the auxiliary programs within the execution cycle as a processing load limit value, and computes the execution sequence wherein a sum of the processing time of the machining program and the processing times of the auxiliary programs executed within the execution cycle is less than or equal to the processing load limit value.

7. The numerical controller for a machine tool according to claim 1, wherein:
   the load computing unit measures the processing time of the machining program when the machining program is executed in the execution processing unit; and
   the execution sequence computing unit computes the execution sequence responsive to the measured processing time of the machining program.

8. A numerical controller for a machine tool, for executing a machining program in a predetermined execution cycle and executing one or more auxiliary programs from among a plurality of auxiliary programs within the execution cycle, comprising:
- a CPU equipped in the numerical controller, the CPU to implement:
- a decoding unit configured to analyze the machining program and the plurality of auxiliary programs;
- a command element extraction unit configured to determine presence or absence of a relationship between the auxiliary programs, based on analysis result of the decoding unit;
- a load computing unit configured to compute a processing time of the machining program and processing times of the plurality of auxiliary programs, based on the analysis result of the decoding unit;
- an execution sequence computing unit configured to compute an execution sequence of the machining program and the plurality of auxiliary programs to execute the auxiliary programs that have the relationship with each other within a same execution cycle, responsive to the processing time of the machining program and the processing times of the plurality of auxiliary programs, wherein based on the analysis result of the decoding unit, the command element extraction unit extracts a continuation command indicative of an instruction to carry out a repetitive process; and the execution sequence computing unit computes the execution sequence wherein the auxiliary program having the continuation command is executed repeatedly in the execution processing unit;
a different load computing unit configured to measure the processing time of the auxiliary program having the continuation command when the auxiliary program having the continuation command is executed in the execution processing unit;
the execution sequence computing unit reconsiders the execution sequence, based on the processing time of the auxiliary program having the continuation command that was measured by the different load computing unit; and
an execution processing unit configured to execute the machining program and the auxiliary programs in accordance with the computed execution sequence.

* * * * *